(No Model.) 2 Sheets—Sheet 1.
H. J. WEST.
APPARATUS FOR THE PRODUCTION OF TRANSPARENT ICE.
No. 381,195. Patented Apr. 17, 1888.
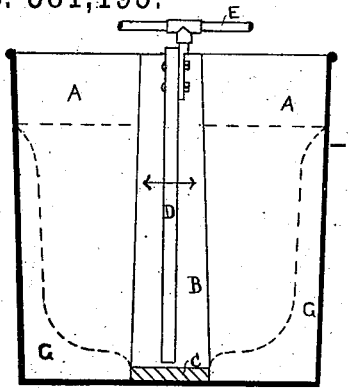
— FIG. 1 —
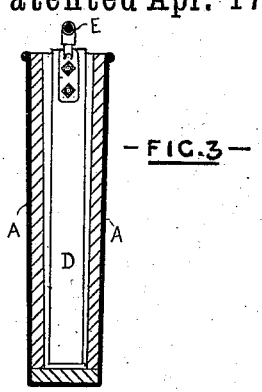
— FIG. 3 —
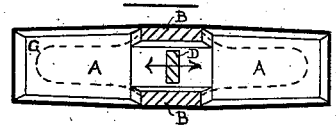
— FIG. 2 —
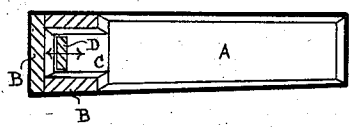
— FIG. 6 —
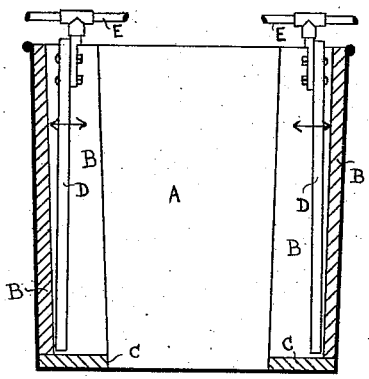
— FIG. 4 —
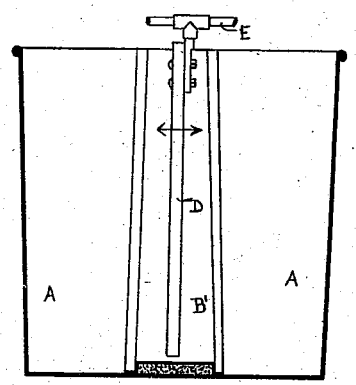
— FIG. 7 —
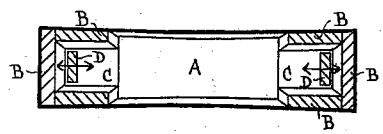
— FIG. 5 —
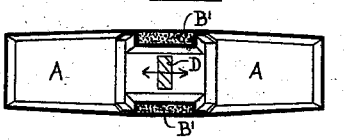
— FIG. 8 —
WITNESSES
Stephen Edward Runyon
William Anderson Smith
INVENTOR
H. J. West
by his attorney
W. M. Beck (No Model.) 2 Sheets—Sheet 2.

H. J. WEST.
APPARATUS FOR THE PRODUCTION OF TRANSPARENT ICE.

No. 381,195. Patented Apr. 17, 1888.

WITNESSES
Stephen Edward Guyson
William Anderson Smith

INVENTOR
H. J. West
by his attorney
W. C. Beck

UNITED STATES PATENT OFFICE.

HENRY JOSEPH WEST, OF 116 SOUTHWARK BRIDGE ROAD, COUNTY OF SURREY, ENGLAND.

APPARATUS FOR THE PRODUCTION OF TRANSPARENT ICE.

SPECIFICATION forming part of Letters Patent No. 381,195, dated April 17, 1888.

Application filed March 5, 1885. Serial No. 157,830. (No model.) Patented in England March 16, 1881, No. 1,147, and in France June 21, 1881, No. 143,520.

*To all whom it may concern:*

Be it known that I, HENRY JOSEPH WEST, a subject of the Queen of Great Britain, residing at 116 Southwark Bridge Road, in the county of Surrey and Kingdom of Great Britain, engineer, have invented certain new and useful Improved Apparatus for the Production of Transparent Ice, (for which I have obtained Letters Patent in Great Britain, dated March 16, 1881, No. 1,147; in France, dated June 21, 1881, No. 143,520;) and I do hereby declare that the following is a full, clear, and exact description of the invention, which will enable others skilled in the art to which it appertains to make and use the same.

My invention relates more especially to the production of transparent ice in molds, but is applicable, also, to the manufacture of such ice on the surface of what are known as "cells."

In order to manufacture transparent ice it has long been customary to agitate the water while it is being frozen; but hitherto it has been difficult to effect that agitation up to the completion of the freezing operation, in consequence of the freezing in of the agitating-instrument employed. To obviate this difficulty various arrangements of pumps or diaphragms have been devised from time to time, working externally from the tank or receptacle in which the ice is being formed. Plungers, rotary paddles, and rocking bars have also been employed to agitate the water contained in molds; but so far as I am aware none of these devices are effective for the production of transparent ice in molds.

By the present invention I am enabled to produce clear or transparent ice in molds or on the surface of cells without any fear of agitating-instruments being frozen in as long as they are kept in motion. In order to effect this I employ in the mold or in the space between the cells, as the case may be, one or more spaces or chambers open to the water to be frozen; but such space or chamber is composed of non-conducting or insulating material so arranged that the brine or other cooling agent surrounding the mold or circulating in the cells has no effect upon the water in the aforesaid spaces or chambers. Paddles or agitators are arranged to reciprocate or oscillate to and fro in these insulated spaces or chambers in such manner as to cause a continual flow of the freezing water over the surfaces of the ice as it forms on the sides of the molds or cells until the whole space between the forming slabs of ice is frozen up into a solid clear or transparent slab or block of ice. These insulated spaces or chambers may be formed at or near the middle of the length of the molds or cells, or at one or both ends, according to the size of slabs or blocks of ice required and other circumstances. They may be composed of any material that is a bad conductor of heat and is not acted upon by the water—such as cork or wood, for example—or they may be made hollow of sheet or cast metal and lined or filled with felt, mineral wool, cork shavings, or other suitable insulating substance, and in some cases the insulation of the above-mentioned space or chamber may be effected wholly or in part by insulating material placed externally to the molds at those points thereof where the freezing effect is not required to take place.

The external insulating material may also be so arranged that the brine or other freezing agent in circulating round the mold shall flow behind the external partition, or the brine may be caused to pass down one side of the partition under the mold and up the other side.

The paddles or agitators may be set in motion in any of the usual ways.

By arrangements above referred to not only is the transparency of the entire slab or block of ice secured, but the dirt or sludge, which in the ordinary methods of agitation is deposited in the slab or block of ice itself, is in this case deposited in the unfrozen water remaining in the insulating-chambers.

In the drawings, Figure 1 represents a longitudinal section of a mold with my invention applied thereto; Fig. 2, a sectional plan; and Fig. 3 a transverse section of same.

Similar letters refer to like parts in all the figures.

A is the ice-mold, which may be constructed of sheet metal in the usual way and furnished with the usual handles for lifting the molds in and out of the bath of brine.

B B are two pieces of material which is a bad conductor of heat—such as cork or wood, for example—and which are secured by screws or otherwise to the side of the mold, and C is a piece of similar material secured to the bottom of the mold. These three pieces of material thus form a chamber open at both ends, which is insulated from the conducting sides and bottom of the mold.

D is a paddle or agitator adapted to fit more or less accurately into the said chamber, but always easily enough to admit of its being moved or reciprocated to and fro therein in the direction of the arrows by means of the rod E, to which it is attached, or by other suitable means.

It will now be readily understood that if the mold be filled to the desired height with the water to be frozen and the whole immersed in the brine of the congealing-tank in the usual way ice will be formed on the sides, ends, and bottom of the mold where the insulating material B C does not occur, but that in the chamber formed by the said insulating material ice will not form, especially if the paddle or agitator D be kept reciprocating to a greater or less extent in the insulated chamber, as above described, and that a further result of the motion of the paddle or agitator will be to keep the water on each side of it in motion, so as to be constantly washing over the surfaces of the ice in course of formation, whereby the said ice will be kept perfectly clear until frozen into solid blocks.

In the arrangement shown in Figs. 1, 2, and 4 two blocks of ice are shown in course of formation, the operation being supposed to be as yet only partially effected. The ice already formed is indicated by the letters G G. The figures show how the block is gradually formed. The shape of the mold tapering from the non-conducting chamber toward the ends prevents the central portion of the block from closing up at the end next the insulated chamber before the farther end has become solid.

Figs. 4 and 5 show (in longitudinal section and sectional plan respectively) similar arrangements; but instead of one insulated chamber placed in the middle part of the length of the mold, as in Figs. 1, 2, and 3, for forming two blocks of ice in one mold with one agitator two insulated or non-conducting chambers are used, one at each end of the mold, one block of ice being formed in the space between them. In this case the insulating material B is applied at the ends of the mold as well as at the sides, each chamber being open at one end only. Each chamber contains its appropriate paddle or agitator, D, and these may be caused to reciprocate toward and from each other (that is, in opposite directions at the same time) in order to agitate the freezing water between them in the most efficient manner; or, if preferred, they may both be moved in one direction at the same time. In this case it is desirable to taper the mold from the two ends toward the center for the purpose above described in reference to Figs. 1, 2, and 3.

Fig. 6 shows in sectional plan a mold having an insulated chamber at one end only thereof, (instead of at both ends, as in Figs. 4 and 5,) and in this case the mold may advantageously taper from the insulated chamber toward the other end, as shown.

Figs. 7 and 8 show in longitudinal section and sectional plan, respectively, another method of constructing the insulated chamber, in which B represents a hollow water-tight chamber formed of sheet or cast metal or other suitable material, the hollow being filled or not with felt, mineral wool, cork shavings, or other suitable insulating substance.

Figure 9:
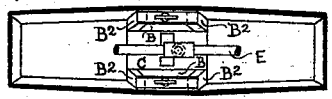
Figure 10:
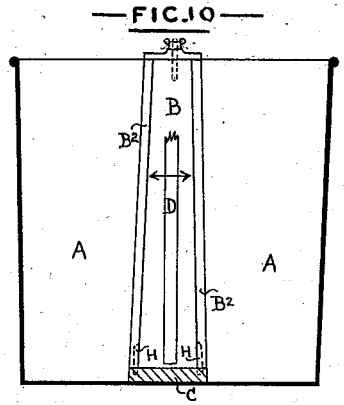

Figs. 9 and 10 show in sectional plan and longitudinal section, respectively, the upright parts of insulated material adapted with movable pieces $B^2$, fitted with dowels H at their lower ends, which take into corresponding holes in the bottom piece of the chamber. These movable pieces $B^2$ are secured at top and prevented from floating by the clip-pieces I, which are held in place by studs and nuts, as shown, or otherwise. The object of these pieces $B^2$ is to provide against the possibility that the end of the block or blocks of ice may adhere tightly to the edges of the insulating material, from which the ice is not so easily separated as from the surface of the mold. For this purpose the pieces $B^2$ may be drawn out with the block or blocks and subsequently detached from them, it being understood that the clip-pieces I are removed first to allow of the said movable pieces $B^2$ being drawn out with the ice, and that after these pieces are detached from the ice they are replaced in the mold ready for another operation; or, if preferred, the whole of the insulating material may be adapted so as to be withdrawn with the ice and afterward detached therefrom.

Figure 12:
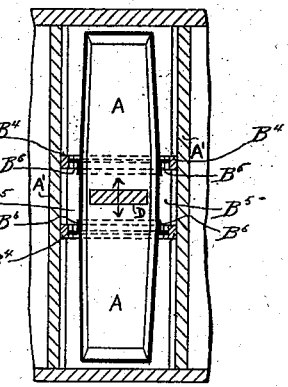
Figure 11:
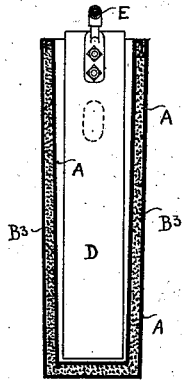
Figure 12:
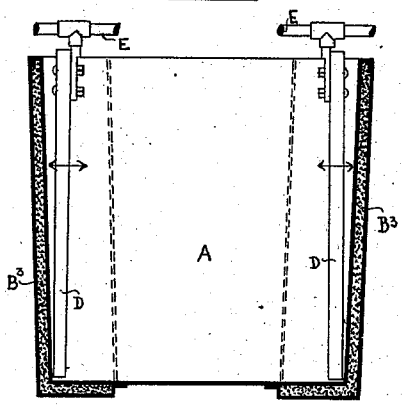

Figs. 11 and 12 show in transverse and longitudinal sections, respectively, the application of insulating or non-conducting material on the outside of the mold instead of inside.

Fig. 12* shows in sectional plan how an insulating or non-conducting chamber may be formed externally to the mold, so as to perform the same office as the insulating or non-conducting material shown in Figs. 11, 12, 13, and 14; A', the brine-tank partition made parallel to side of mold; A, the mold; $B^4$, strips of leather, cork, or other suitable material fixed to the sides and bottom of the brine-tank; $B^6$, strips of metal of suitable section fixed onto sides and bottom of mold, a tight joint being thus obtained between the sides and bottom of the brine-tank and of the mold when the latter is in place. The space $B^5$, forming the insulating-chamber, being freed from brine, becomes an air space or chamber which prevents the formation of ice in the space when the paddle D operates. It is obvious that the same result may be obtained by fitting the leather, cork, or other suitable material to the mold and the strip of metal to the brine-tank, and that instead of the partitions A' parallel to the sides of the mold they may be vertical, and the strips of leather, cork, &c., so formed as to present a surface parallel to the sides of the mold.

Figure 13:
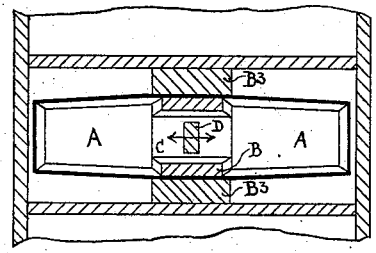
Figure 14:
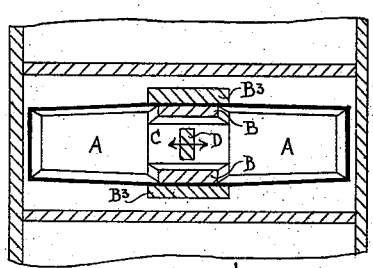

In Figs. 13 and 14 (which are also sectional plans) insulating or non-conducting material is shown outside the mold as well as inside, the object being to further prevent the formation of ice in the insulated chamber, which may sometimes happen when working with brine at very low temperatures. In Fig. 13 the mold is shown in an ice-box with partitions, the brine being caused to flow down one side of the external insulating material, $B^3$, under the lower end thereof, and up the other side. In Fig. 14 the brine is caused to flow behind the external insulating material, $B^3$.

As above stated, I consider it preferable to form the molds or cans A tapering from the insulated chamber to the opposite end or ends for the reason explained; but it is not essential that they should be so formed, as they may be made with parallel sides horizontally, but for the more ready removal of the ice when made they should be made to taper vertically in the usual way.

I prefer to effect the agitation by causing the paddles or agitators D to reciprocate or oscillate, as above described, but they may be caused to revolve on their vertical centers. If desired, holes may be formed in the paddles or agitators D, as shown in dotted lines in Figs. 11 and 12, in order to prevent splashing or washing over of the water in the mold.

The above described arrangements are also applicable for similar purposes to what are known as "cells" or "hollow walls," through which brine or other non-congealable liquid is circulated, as well as to molds or cans, it being merely necessary to apply the insulating or non-conducting material to the parts of the surface of such cells where the agitator is required to work. I have not deemed it necessary to specially describe or illustrate such application, as it will be readily understood from the descriptions and illustrations applicable to molds or cans.

By the above-described arrangements not only can blocks or slabs of ice be made perfectly transparent throughout their thickness, but if the water being frozen should contain mechanical impurities the greater portion of such impurities will remain in the water left in the insulated chamber, instead of being frozen into the block or slab, as heretofore.

Having now described the nature of the said invention and the manner in which the same is to or may be carried into effect, I would have it understood that I make no claim generally to a separate chamber for the agitation of the water being frozen on or between cells or hollow walls, in which chamber an agitator or paddle is caused to act upon the said water and to keep it in motion, as I am aware that such has already been proposed and patented.

I am aware that it is not broadly new to employ an agitator working in an insulated chamber within a receptacle for water which is to be frozen, and this construction and combination I do not broadly claim; but What I do claim is—

1. The combination, with a receptacle for water to be frozen, of a chamber within said receptacle having walls of insulating material, two sides of which are open from top to bottom, and an agitator operating in said insulated chamber, for the purpose set forth.

2. The vertical agitator D, provided with a handle, E, for giving it backward and forward horizontal motion, in combination with an insulating-chamber open on two sides from top to bottom, and a receptacle for water to be frozen, said insulated chamber being within said receptacle and said agitator operating within said chamber, substantially as set forth.

HENRY JOSEPH WEST.

Witnesses:
WILLIAM HENRY BECK,
STEPHEN EDWARD GUNYON.
*Both of 115 Cannon Street, London.*